Feb. 18, 1964 — A. W. SMART — 3,121,646
APPARATUS FOR COATING ARTICLES BY DIPPING
Filed June 22, 1961 — 9 Sheets-Sheet 1

INVENTOR
A. W. SMART
BY Otto John Munz
ATTORNEY

Feb. 18, 1964  A. W. SMART  3,121,646
APPARATUS FOR COATING ARTICLES BY DIPPING
Filed June 22, 1961  9 Sheets-Sheet 2
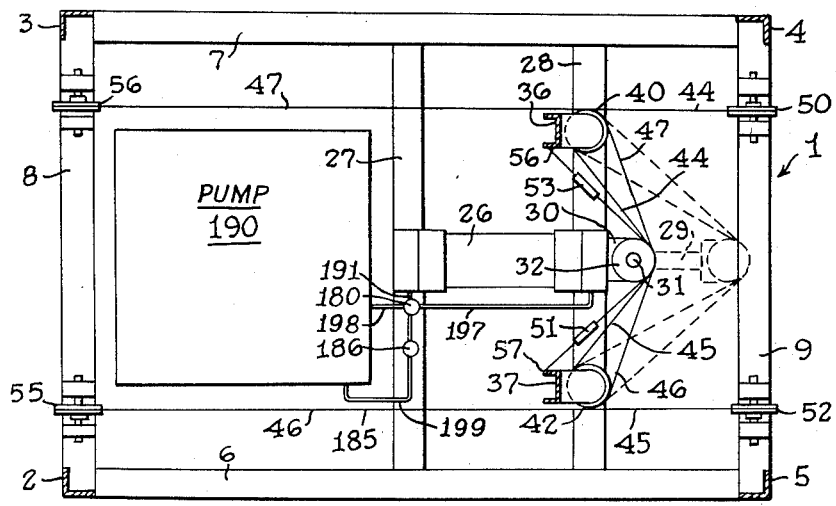
FIG. 3.
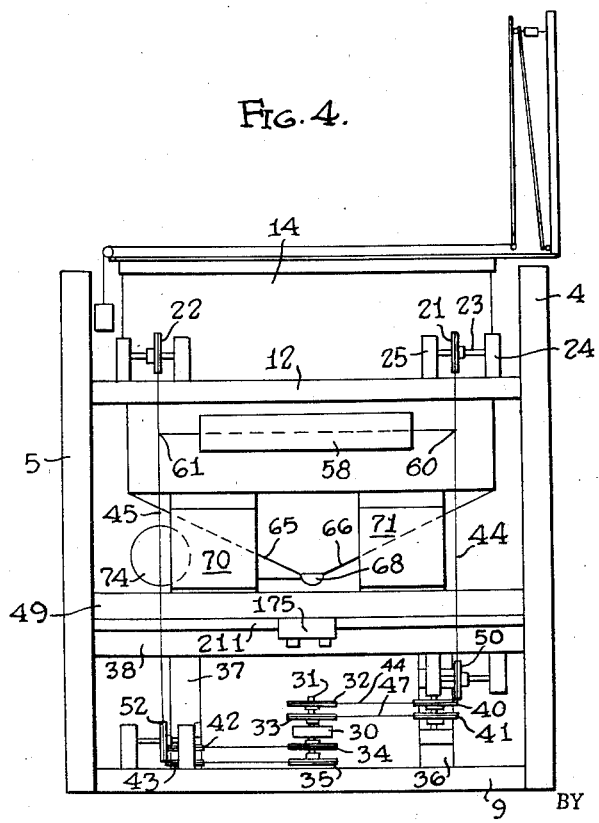
FIG. 4.
FIG. 5.
INVENTOR
A. W. SMART
ATTORNEY

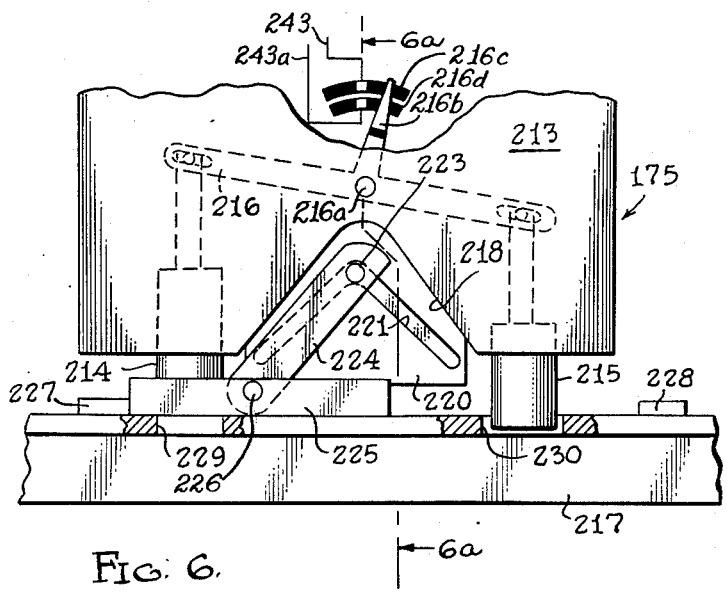
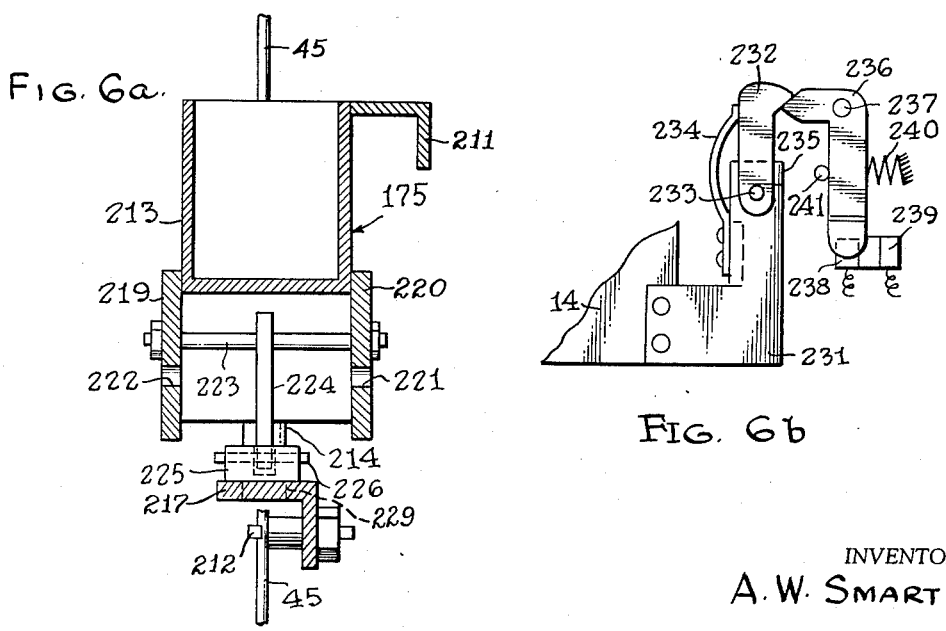

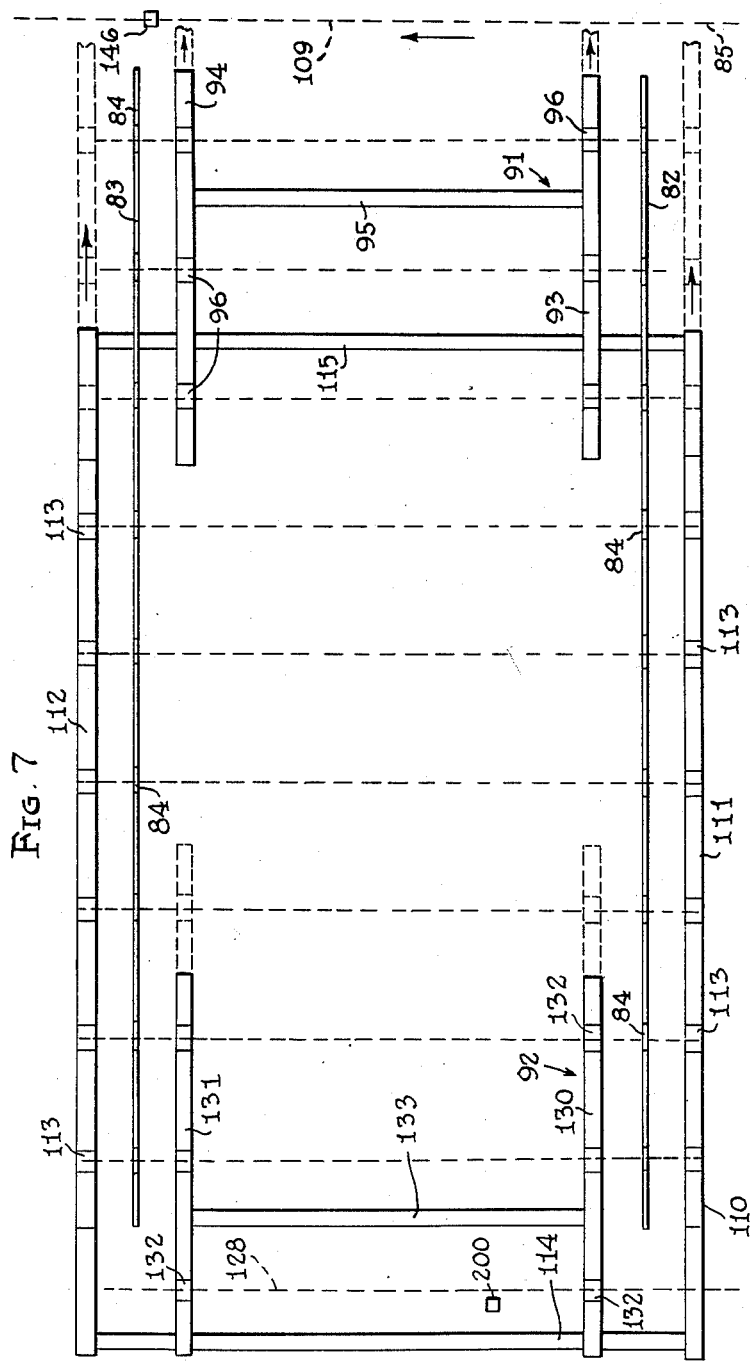

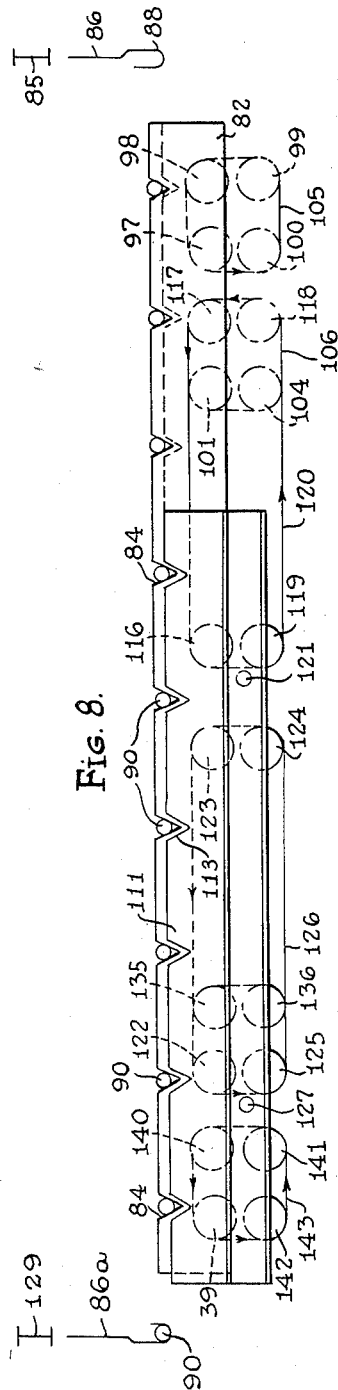

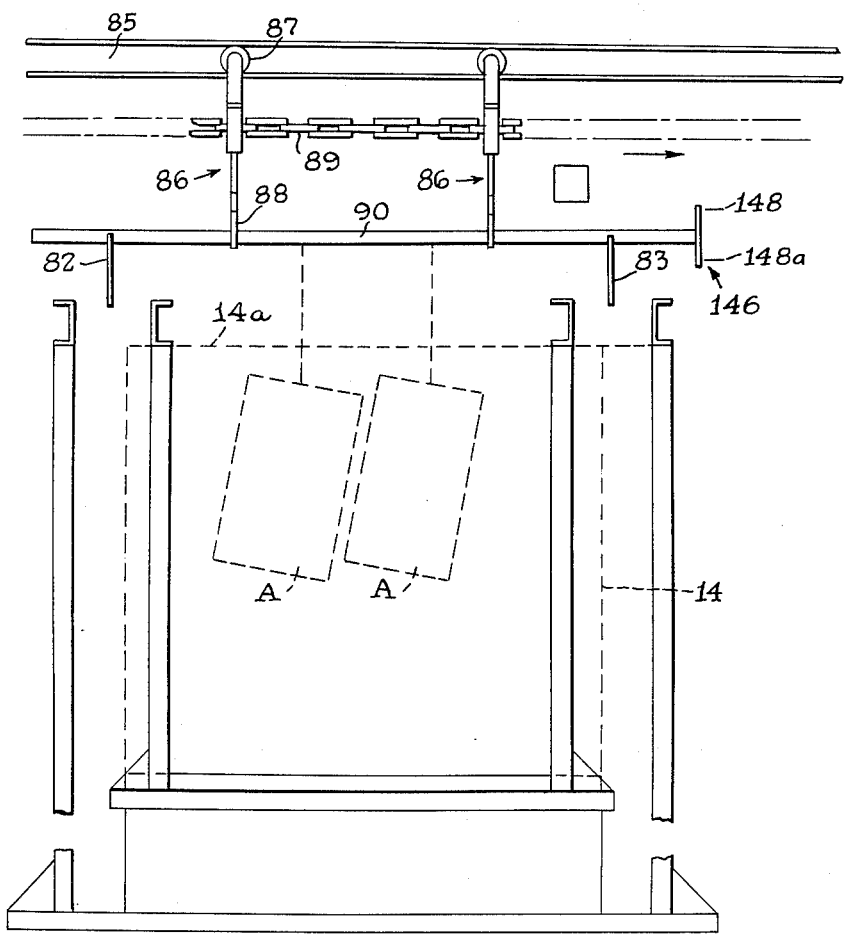

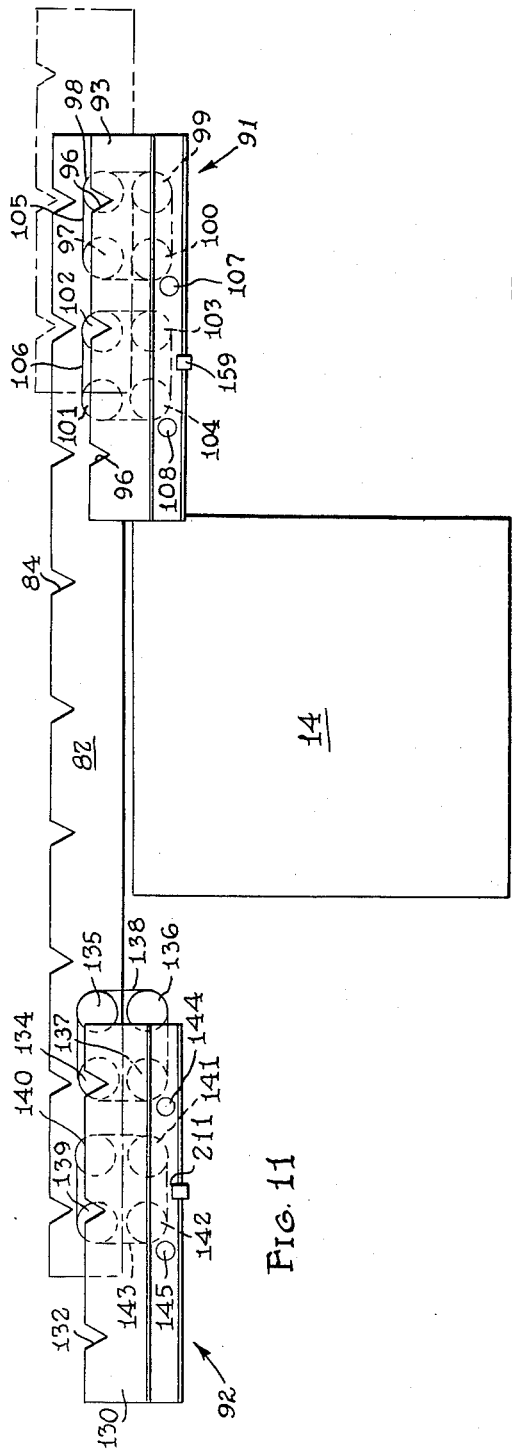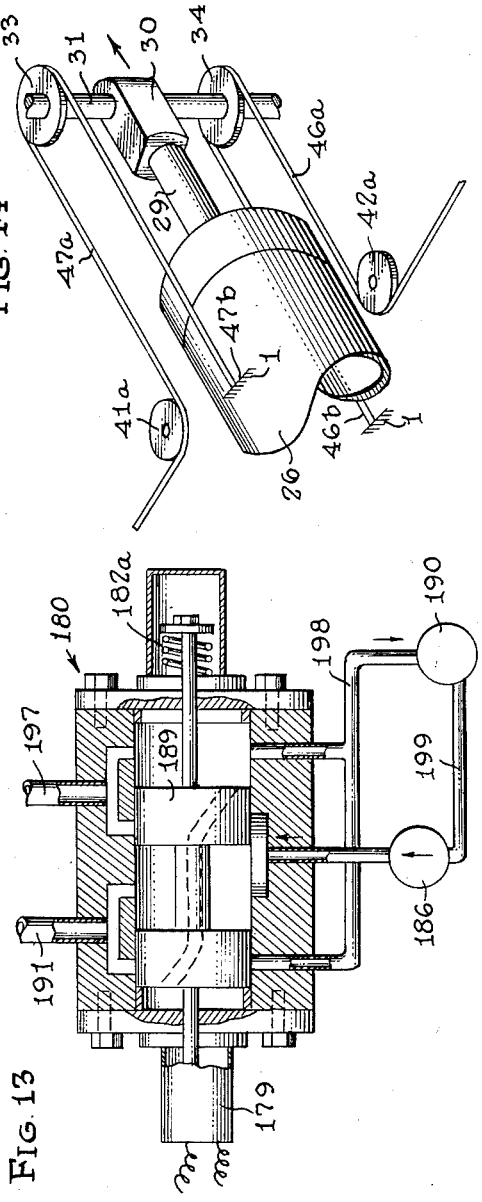

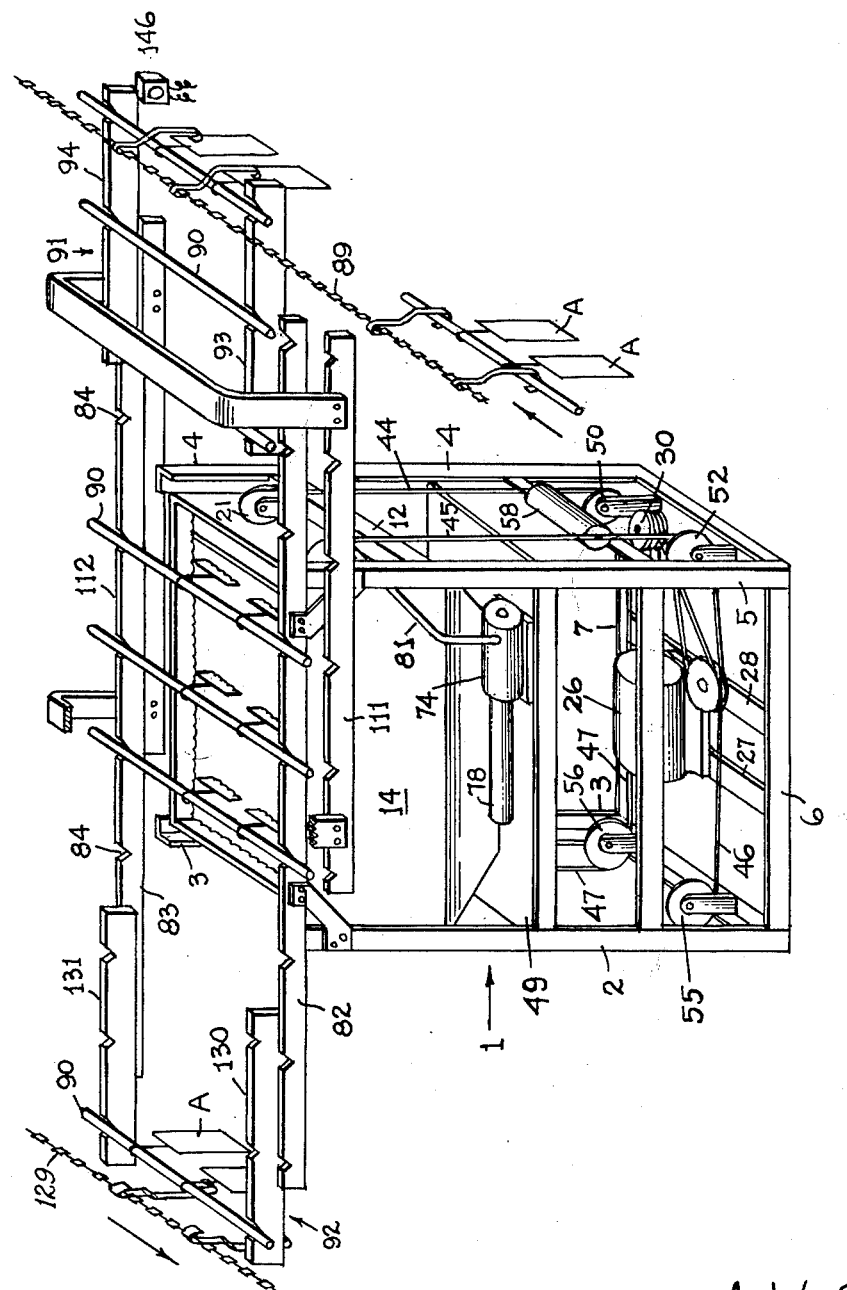

United States Patent Office 3,121,646
Patented Feb. 18, 1964

3,121,646
APPARATUS FOR COATING ARTICLES BY DIPPING
Alfred W. Smart, deceased, late of Hempstead, N.Y., by Helen A. Smart, executrix, Hempstead, N.Y., assignor to Midland-Ross Corporation, a corporation of Ohio
Filed June 22, 1961, Ser. No. 131,701
16 Claims. (Cl. 118—1)

This invention relates to an apparatus for coating articles by dipping.

It is the chief object of the invention to provide an apparatus for dipping which ensures a smooth uniform coating using liquids of varying types for articles of a wide range of shapes and sizes.

Another object is to provide an apparatus as aforesaid which is capable of effecting a large reduction of coating costs, for any given article and for any particular coating fluid.

A further object is to provide an apparatus which, while rapid and efficient in operation, is also capable of manufacture at a relatively low cost.

Yet another object is to provide an apparatus of the type mentioned which is of simple and sound construction, easily serviced and repaired, quickly convertible to different types of coatings and articles to be coated, and a general advance in the art of coating by immersion.

The foregoing and other objects and advantages are attained by the combination of a vertically-movable dip tank, together with controlled power means for elevating and lowering the tank in timed relation with conveyor mechanism operating to dispose articles to be dipped in positions over the tank when in lowered position. The conveyor mechanism includes means for transporting suspended objects to be dipped transversely of the tank to a loading position at one end thereof. Subsequently the articles are, by automatically operating means, transferred, one by one, to a pair of collector bars fixedly mounted at and along respective sides of the tank. The articles are advanced, step by step in uniformly spaced relation along and supported by the collector bars until, when a predetermined number, based upon the size of the tank and other considerations, have been collected thereon, they are lifted and transferred as a unit by accumulator mechanism to a position directly over the tank. The tank is then automatically elevated to immerse the collection of articles, then lowered, after which the accumulator mechanism transfers the collection of dipped articles to a position further along the collector bars. Finally, from the collector bars, the dipped articles are picked up, one by one and transferred to conveyor mechanism by which they are carried away for subsequent processing. The operation is a continuous production line procedure such that all parts move in precisely timed relation. For example, while the tank is being elevated to dip a collection of articles on the collector bars, a second group or collection is being transferred from the convey leading to the tank, to the collector bars, ready to be transferred to dipping position by the accumulator bars, as soon as the previous dipped collection has been moved to position for pickup and transfer to the conveyor leading from the machine.

In the drawings:

FIG. 3 is a horizontal sectional view taken in a plane identified by line 3—3, FIG. 2 showing the tank elevating means in greater detail;

FIG. 4 is a side elevation of the tank assembly and elevating means therefor, to the same scale as FIGS. 1, 2 and 3;

FIG. 5 is a detail view, to an enlarged scale showing the manner in which the tank is guided for vertical translation at each of its four corners;

FIG. 6 is a front elevational view, to an enlarged scale, of the tank position responsive control switch, parts being omitted for clarity of illustration;

FIG. 6a is a sectional view corresponding to FIG. 6 taken in a plane identified by line 6a—6a, FIG. 6;

FIG. 6b is a detail of a form of switch alternative to that of FIGS. 6 and 6a;

FIG. 7 is a plan view of the article transfer mechanism, including the transfer units, advancing units and collector bars;

FIG. 8 is a side elevation of the main transfer unit showing the same in retracted position about midway between its upper and lower levels of travel; the end transfer beams being omitted for clarity of illustration;

FIG. 9 is an end elevation showing the delivery conveyor base and tank frame, the dip tank itself being shown in dashed outline only;

FIG. 10 is an elevation corresponding generally to FIG. 8 but showing one main transfer beam in substantially its lowermost position;

FIG. 11 is a side elevation showing one collector bar and the two conveyor units in substantially lowermost positions;

FIG. 13 is a detail view, partly in section, of a solenoid valve controlling the elevation and descent of the hydraulically-operated dip tank;

FIG. 14 is a perspective detail view to an enlarged scale, of a second and preferred form of connection between the tank-elevating cable and hydraulic cylinder; and FIG. 15 is a perspective view of the assembled machine.

The Dip Tank Elevating Mechanism

Figure 1:
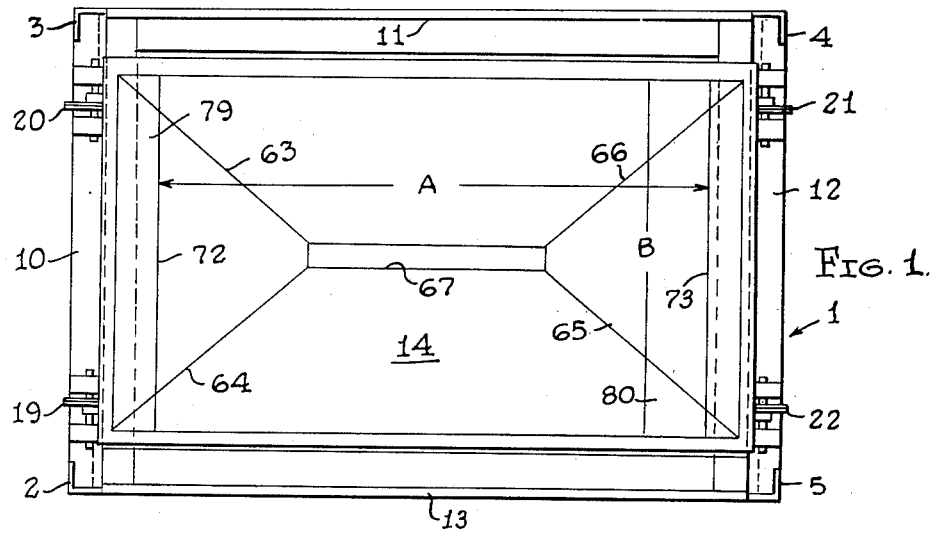
FIG. 1 is a plan view of the dip tank assembly.

Referring in detail to the drawing, particularly FIGURES 1 through 4, 1 identifies generally a tank frame or base consisting essentially of four vertical posts 2, 3, 4 and 5, rigidly interconnected at the respective corners of a rectangle, by base horizontals such as 6, connecting posts 2 and 5, and 7, connecting posts 3 and 4. Transverse base horizontals are identified at 8 and 9, connecting the pairs of posts 2, 3 and 4, 5, respectively. Referring more particularly to FIG. 1, four upper horizontals are identified at 10, 11, 12 and 13; and referring to FIGURES 2 and 4, it will be noted that these are spaced an appreciable distance below the tops of the posts. The posts are conveniently formed of 90° angle bars and the entire frame is welded or bolted together to form a rigid, unitary item. Intermediate horizontals are also used as and for purposes subsequently identified.

Figure 2:
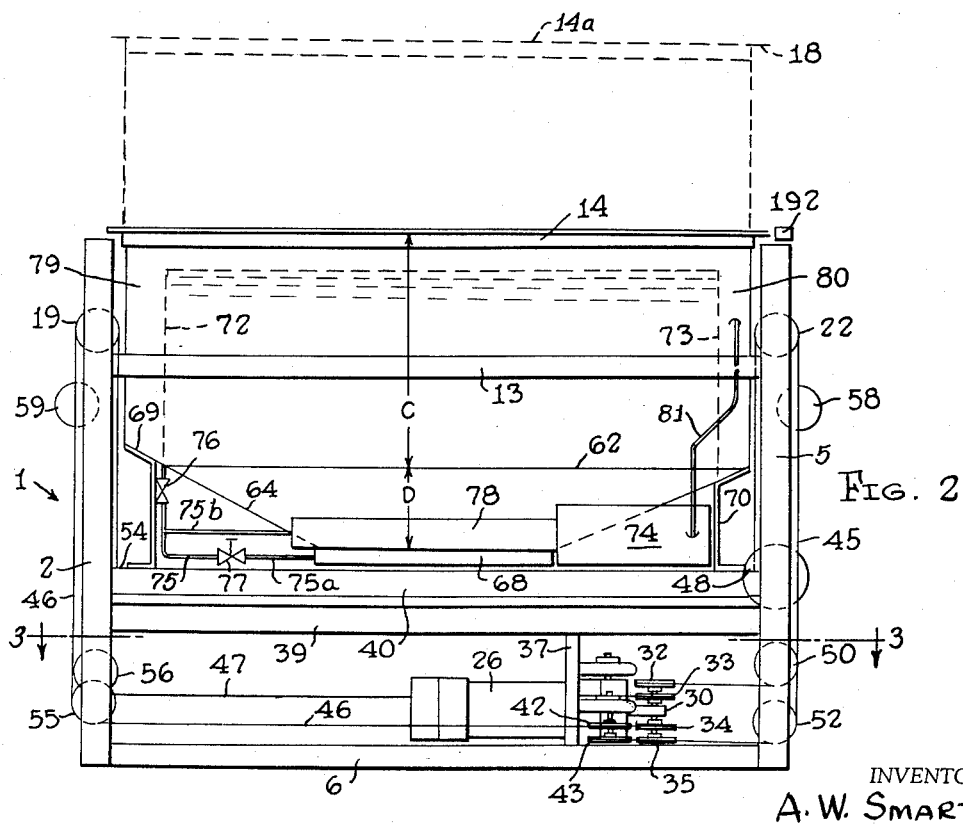
FIG. 2 is a front elevation of the tank assembly and its elevating mechanism.

A dip tank and liquid circulating means, generally identified at 14, FIGS. 1, 2 and 4, will be subsequently described in detail. For the present it is noted that this tank is rectangular in plan and sized to fit within the frame outline determined by posts 2, 3, 4 and 5. The tank and its circulating mechanism are mounted for guided vertical translation as a unit by the aforesaid posts. Thus, from FIG. 5 which shows a detail of the guide roller means at post 3, it is noted that a bracket 15, fixed with the contiguous corner of the tank, has bearings 16 and 17 in each of which there are journaled rollers 16a and 17a, respectively, to make rolling contact with the inside surface of a corresponding side of the post. Two vertically spaced pairs of rollers, mounted as shown at FIG. 5, are fixed at each of the four corners of the tank, so that the tank and its auxiliaries, subsequently described, are positively guided for vertical translation by and between the posts. Referring more particularly to FIGURE 2, the pairs of rollers just described are so connected with the tank as to afford a range of vertical translation from the lowermost position shown in this figure, to an uppermost position indicated in dotted lines at 18. It is for this reason that the upper ends of the posts extend beyond horizontals 13, etc., as shown upon FIG. 2.

Means are provided for elevating and lowering the tank between the two limiting positions just noted. Top horizontal 10, FIG. 1, mounts spaced pulleys 19 and 20 adjacent the corresponding corners of the frame. Likewise, top horizontal 12 mounts pulleys 21 and 22. The mounting of all pulleys is identical and from FIG. 4, and referring particularly to pulley 21, the mounting consists of a shaft 23 to which the pulley is fixed, and spaced, aligned bearings 24 and 25 each fixed to the top face of the horizontal 12 and journaling shaft 23 at its respective ends. Pulleys 19, 20, and 22 are journaled in a manner identical with that just described for pulley 21.

A hydraulic cylinder 26 is fixed at its respective ends to parallel spaced cross beams 27 and 28, which, as shown upon FIG. 3, are in turn, connected at their ends to, and supported by base horizontals 6 and 7. The cylinder is thus mounted horizontally in and along the central vertical plane of frame 1. The piston of the cylinder has a rod 29, FIG. 3, extending through a packing gland fixed with the right end of the cylinder as the parts are viewed upon FIGURES 2 and 3. The free end of rod 29 has a head 30, FIGURES 2, 3 and 4, to which is fixed the mid-portion of a vertical shaft 31. A first pair of pulleys 32 and 33 are independently journaled on the end of shaft 31 projecting upwardly from head 30. A second pair of pulleys 34 and 35 are independently journaled upon the end of shaft 31 projecting downwardly from head 30. Thus, when fluid under pressure is admitted to cylinder 26, by a control system subsequently described, the four pulleys 32 through 35 are horizontally translated as a unit from the position shown in full lines upon FIG. 3, to that shown in dotted lines.

Referring more especially to FIGS. 3 and 4, a pair of spaced brackets 36 and 37 extend vertically between base cross beam 28 and a second intermediate beam 38, FIG. 4, positioned directly above beam 28, parallel therewith, and having its ends fixed with a pair of intermediate longitudinal beams, one of which is identified at 39, FIG. 2. Bracket 36 has bearings journaling a first pair of vertically-spaced idler pulleys 40 and 41, for independent rotation on a common vertical axis. As seen from FIG. 4, these idlers are horizontally coplanar with hydraulic cylinder pulleys 32 and 33, respectively. Likewise, bracket 37 carries bearings journaling a second pair of idler pulleys 42 and 43 for independent rotation on a common vertical axis and which are horizontally coplanar with hydraulic cylinder pulleys 34 and 35, respectively.

Tank 14 is supported and its vertical movement effected, by four cables 44, 45, 46 and 47. Referring to FIGURES 2, 3 and 4, cable 44 has one end attached to one corner of base 49 of the tank assembly. Then it passes vertically upwardly, over and about pulley 21, downwardly about a pulley 50 journaled on a horizontal axis in bearings carried by and depending from beam 38, thence horizontally inwardly to and about pulley 40, thence to and about pulley 32 on the hydraulic piston rod head 30 to an anchorage of its other end at point 57 on bracket 37, FIG. 3. An adjustment and tightening turnbuckle 51 is inserted in this end of the cable.

Cable 45 has one end attached at point 48, FIG. 2, to the corresponding corner of tank base, from whence it passes vertically upwardly over pulley 22, downwardly to and about an idler 52 FIG. 4, horizontally inwardly to and about pulley 43, transversely about hydraulic head pulley 35 to an anchorage of its other end on bracket 36. A turnbuckle similar to and directly below turnbuckle 53 is inserted in this end of cable 45 to provide for tightening and adjustment thereof.

Cable 46 has one end connected to tank base 49 at point 54, FIG. 2, from whence it extends vertically upwardly to and about pulley 19, thence downwardly to, and inwardly about a pulley 55 journaled in bearing fixed to base horizontal 8, thence longitudinally along the frame, as will be clear from inspection of FIG. 2, to and about pulley 42, thence horizontally and transversely to and about pulley 34 carried by the head 30, and then to bracket 36 to which its other end is attached at 56 through turnbuckle 53.

Similarly, cable or chain 47 has one end connected to the remaining corner of tank base 49 from whence it passes vertically upwardly to and about pulley 20, then downwardly to and about pulley 56, FIGS. 2 and 3, journaled in bearings fixed to base horizontal 8, thence forwardly to and about pulley 41, transversely to and about the remaining pulley 33 on the head 30 of the hydraulic piston rod 29, to a connection of its other end to bracket 37 at a point directly below point 57.

The weight of the tank assembly is conveniently counterbalanced by weights 58 and 59, FIG. 2. As best shown at FIG. 4, one end of weight 58 is attached at 60 to the vertical pass of cable 44, between pulleys 21 and 50, while its other end is attached at 61 to the corresponding vertical pass of cable 45. Weight 59 is similarly connected to and supported by cables 46 and 47.

By the foregoing construction, the introduction of fluid under pressure by valve control means, subsequently described in detail, forces head 30 horizontally to the right as the parts are viewed upon FIGURES 2 and 3, and effects a magnified vertical movement of the tank assembly. Due to the arrangement of cables as illustrated at FIG. 3, the time rate of elevation of the tank increases gradually from the initial or lowermost position shown in solid lines upon FIGURE 2, to the final elevated position depicted in dotted lines, for a constant rate of travel of the head 30. The rate is, essentially, a sine function of the angles which the pass of cable 47 between rollers 40 and 32, for example, makes with the line of travel of head 30. However, it will be understood that the velocity of the tank in elevation and descent, as well as the acceleration and deceleration, can be precisely and accurately controlled by corresponding control of the rates of admission to and exhaust from cylinder 26 of the working fluid, such as oil, as will be subsequently described.

The elevating mechanism just described is relatively simple, rugged, and reliable, long-lived, easily serviced and repaired, and, more importantly, affords a smooth, vibrationless translation of the tank and the dip liquid therein.

At FIG. 14, there is shown a second and preferred form of connection between the tank-elevating cable and the hydraulic cylinder. Since the cylinder parts may be the same as previously described in connection with FIGS. 2, 3 and 4, it is sufficient to identify cylinder 26, piston rod 29, head 30, and two pulleys 33 and 34. For clarity of illustration, the two pulleys 32 and 35 have been omitted, it being understood that these are journaled on shaft 31 in the manner previously described. However, cable 46a corresponding to cable 46 of FIGS. 2, 3 and 4, has one end anchored at point 46b to base 1 or a part fixed therewith and which is so disposed that the cable passes parallel with rod 29, to and about pulley 34, thence back, again parallel with the rod, to and about pulley 42a, thence horizontally outwardly to and about pulley 42, as previously described in connection with FIGS. 2, 3 and 4.

Likewise, one end of cable 47a has one end anchored at 47b to a convenient part of frame or base 1, from whence it passes parallel with rod 29 to and about pulley 33, thence back, again parallel with the rod, to and about pulley and horizontally outwardly to and about pulley 41, as previously described in connection with FIGS. 2, 3 and 4.

In the modification being described, shaft 31 carries pulleys 32 and 35, as previously described. But since the cables passing thereabout are arranged similarly to 47a and 46a, just described, they have been omitted from FIG. 14. By the construction just described, the rate of elevation and descent of the tank is constant for a constant rate of admission to, or exhaust of, pressure fluid from, cylinder 26 and, of course at a rate translation twice that of head 30.

The Dip Tank Assembly

The tank 14 and base 49 upon which it is mounted, have been previously identified. This base may be either a flat rectangular metal plate, or an item built up from angles or beams welded into rectangular form and properly braced at the corners. The upper portion of the tank, in this particular case, is of essentially parallelepipedal form down to the plane identified at 62, FIGS. 2 and 4. From this plane downwardly, the bottom is of inverted pyramidal form, converging along its sides and ends, along intersecting lines 63, 64, 65 and 66, as best shown upon FIG. 1 and terminating in a slot-like opening 67 (FIG. 2) which is closed by a trough-like sump 68. See FIG. 4. The tank is supported on its base by four brackets two of which, 69 and 70, appear upon FIG. 2, and 70 and 71 upon FIG. 4. From these figures it is noted that each bracket is a plate bent to generally U-form, so that one leg rests flat on base 49 while the other leg contacts the sloping bottom of the tank at its junction with the respective end walls. However, reference to FIG. 2 shows that the two ends of the tank are not identical, so that brackets 70 and 71 are somewhat shorter than bracket 69 and its mate, not shown, at the other end.

At the left of the tank, as the parts are viewed upon FIGURES 1 and 2, a vertical partition plate 72 extends transversely across between side walls. As shown at FIG. 2, the top edge of this partition plate is below the plane of the tank's top. The partition has liquid-tight joints with the tank and forms therewith an overflow trough or compartment 79. Likewise, a second vertical partition plate 73 is fixed within tank 14 across and in spaced relation with the right end thereof to from a supply chamber 80. The top edges of partitions 72 and 73 are horizontally cloplanar.

A circulating and liquid supply pump 74 is mounted on base 49 beneath and at the left of the tank as the parts are seen upon FIG. 4. Referring to FIG. 2, piping 75, including valves 76 and 77 connects the bottom of the trough formed by partition 72, with (a) sump 68 and (b) pump intake 78, through branches 75a and 75b, respectively. In normal operation valve 76 is open and valve 77 partly closed, so that overflow coating liquid flows by gravity from compartment 79, through pipe 75b to pump 74 and forced through pipe 81, into supply compartment 80. The pump may be a variable volume machine of any well-known type, such as a sliding vane type, so that its rate of delivery into compartment 80 may be adjusted to be slightly in excess of the rate of liquid consumption. The liquid flows over the edge of partition 73 into the coating vat or tank, and excess delivery flows over the top edge of partition 72, into compartment 79 and is returned to pump 78 for reuse, as previously explained. Thus the level of liquid in the dip tank 14 is maintained constant at all times, in the common plane of the top edges of partitions 72 and 73.

The Conveyor Mechanism

Referring to FIGURE 9, the top of tank 14 when elevated, is indicated by the dash line 14a. A pair of spaced parallel collector bars 82 and 83 are fixed horizontally by any suitable bracket means, not shown. Reference to FIG. 9 shows that each bar is positioned a little outwardly of a respective side of the dip tank 14. The top edges of these collector bars have uniformly-spaced notches 84 (FIG. 11) which, for clarity of illustration, will be assumed to be spaced at one-foot intervals. Actually, however, the spacing of these notches will vary with the size, shape and/or type of articles being coated, and is not limited to any particular dimension so long as the spacing is uniform.

The conveyor track which delivers the loaded "sticks" or rods to the vat is identified at 85, FIGS. 8 and 9, and is shown as a simple I-beam supported at intervals by posts or hangers, not shown. Traveling bracket assemblies 86, two of which are shown upon FIG. 9, are supported by respective pairs of rollers 87 upon the lower flange of beam 85 for guided translation therealong. The lower ends of these brackets are hooked as best shown at 88, FIG. 8. A traveling chain or cable 89 connects all of the traveling hook assemblies so that they move at properly-spaced intervals at uniform speed, along track 85. This speed is coordinated with the rate of operation of the transfer mechanism, as will be subsequently described. From FIG. 9 it will be noted that the article-support rods 90 are of a length sufficient to span the distance separating collector bars 82 and 83, and also that each of these rods is supported by and between a pair of hook assemblies 86, depending from chain 89. This figure shows the longitudinal position of rod 90 at the time it is transferred to the collector bars.

The Transfer Units

First and second transfer units generally identified at 91 and 92, FIG. 11, are disposed at respective sides of tank 14. Referring especially to FIGS. 7, 8, 10 and 11, unit 91 comprises a pair of laterally-spaced horizontal parallel beams 93 and 94 rigidly interconnected by any suitable overhead structure which does not interfere with the transfer of loaded support rods 90. Such structure is generally identified at 95. Both beams are shown with transversely aligned notches 96 similar to notches 84 in collector bars 82 and 83 and having like uniform spacing which in the machine illustrated, is assumed to be one foot. As example, each beam is shown with three notches. Means are provided to translate unit 91 so that each point thereof moves at a lower elevation, first horizontally one foot toward conveyor track 85 until the pair of notches 96 nearest the track lie directly below a support rod 90 suspended from chain 89 in position as shown upon FIG. 9, as indicated in dotted broken lines upon FIG. 7. Next the beams move upwardly to pick up the aforesaid rod and raise it from the hooked lower ends of assemblies 86. Then the beams are translated horizontally in the reverse direction to correspondingly shift the rod to a position directly over the first notches 84 in collector bars 83 and finally, the beams are translated vertically downwardly to starting position and thereby lower the rod until it rests in the aforesaid notches and is supported entirely by the collector bars 82 and 83.

Although other mechanical means may be used to impart the desired rectangular path of motion to the transfer beams, a convenient way to do this is, as best shown upon FIG. 11, by means of two sets of sprockets, one set being identified at 97, 98, 99 and 100 and the second set at 101, 102, 103 and 104. All sprockets are mounted in a common vertical plane immediately adjacent beam 93. The axes of the sprockets of the first set are horizontally parallel and arranged at the respective corners of a first rectangle. The axes of the sprockets of the second set are corresponding disposed at the respective corners of a second rectangle, as will be evident from inspection of FIG. 11. A first chain 105 passes about and interconnects sprockets 97 through 100. A second chain 106 passes about and interconnects sprockets 101 through 104. Each chain is pivotally connected with beam 93 by horizontally-spaced bearing means identified at 107 for chain 105, and at 108 for chain 106.

The mechanism just described, including eight sprockets, two chains, and their pivotal connections with beam 94 of unit 91 is duplicated at the other side. The four sets of sprockets are mechanically interconnected by any suitable mechanism, not shown, so that all sprockets are driven in synchronism. Such mechanism may take the form of gearing interconnecting one sprocket of each set, and including a rotatable shaft, not shown, extending across and above collector bars 82 and 83. The dimensions are such that the total horizontal travel of the unit 91 is one foot in the model shown. The rearwardmost and forewardmost positions of this unit are shown in solid and dotted lines, respectively, upon FIG. 11. At its upper level the notches 96 therein are above the notches 84 in bars 82 and 83, while at its lower level, its notches are below those in the collector bars, all as clearly indicated in FIG. 11. Furthermore, the parts are so related that for each vertical pass of unit 91, the notches of its beams are aligned in a common vertical plane with those of the collector bars.

The direction of travel of chains 105 and 106 is indicated by the arrows, FIG. 10, so that, in operation, the unit moves forwardly at lower elevation until its forward notches are beneath the line of travel of the rods 90 advancing on conveyor chain 89. This line is identified at 109, FIG. 7. In this position the bars move upwardly to pick up a loaded rod 90, then they move rearwardly at upper elevation until the rod supported thereby is directly above the forwardmost notches in collector bars 82 and 83, and then they move vertically downwardly to deposit the rod into the aforesaid notches of these bars, thus completing a cycle. Although beams 93 and 94 of unit 91 are shown with three notches each, it will be understood that this is by way of example only and that the number may be increased, depending upon the size of the dip tank and the size and/or shape of the articles being coated.

The Accumulator Unit

An accumulator unit is identified generally at 110, FIG. 7, and comprises a pair of horizontal, transversely-spaced beams 111 and 112. Reference to this figure shows that these beams are mounted each outside and parallel with a respective one of the collector bars 82 and 83 and that each has, in this model, six notches 113 in its upper edge spaced at one-foot intervals. These beams are rigidly interconnected at their respective ends, by rods 114 and 115, FIG. 7.

The accumulator unit is mounted for translation in a rectangular path by mechanism similar to that described previously, for transfer unit 91. However, for the model illustrated, the total horizontal travel is three feet, that is, over a distance spanned by three consecutive notches 113. Thus, referring more particularly to FIGURES 8 and 10, a first set of sprockets 116, 117, 118 and 119 are journaled in the frame of the machine closely adjacent the inside surface of beam 111 and are disposed wtih their axes at the respective corners of a rectangle. These sprockets are connected by a chain 120 which is pivotally attached to beam 111 by a bearing 121. A second set of four sprockets 122, 123, 124 and 125 are similarly journaled on the machine's frame at the rearward end of unit 110 and are connected for synchronous rotation by a chain 126 which is pivotally connected with beam 111 by bearing 127. The two sets of sprockets are duplicated at the other side of the machine for and just inside beam 112, so that, as will be clear from inspection of FIGURES 8 and 10, synchronous rotation of the two sets of sprockets just identified causes movement of the accumulator unit chains 120, 126, etc., in a direction indicated by the arrows thereof, and, starting from the positions of bearings 121 and 127, shown upon FIG. 10, first translates unit 110 horizontally forwardly along its lower pass, as indicated in dotted broken lines upon FIG. 7, a distance equal to the spacing of three consecutive notches, then upwardly, rearwardly and downwardly. In their lower pass forward, the top edges of beams 111 and 112 are below the corresponding edges of collector bars 82 and 83, while in their upwardmost and rearward pass their top edges are above those of the collector bars.

The second transfer unit 92 has been previously mentioned and is shown upon FIGS. 7, 8 and 11. This unit in the model shown, is essentially a duplicate of unit 91 heretofore described in detail. Its purpose is to pick up the flight rods, one by one, after the articles suspended therefrom have been dipped, and to re-transfer them to the hooks of a conveyor chain returning along a line indicated at 128, FIG. 7. In FIG. 8, the I-beam supporting the conveyor is shown in cross section and identified at 129 and one of the hooks suspended therefrom at 86a. The return conveyor may be the returning pass of chain 89, or a separate conveyor unit.

Since unit 92 may be a duplicate of unit 91, it is deemed sufficient to identify beams 130, 131 having three notches 132 in their upper edges, and interconnecting rod or means 133. Also identified upon FIG. 11 are first set of four sprockets 134, 135, 136 and 137 interconnected by chain 138, a second set of four sprockets 139, 140, 141 and 142 interconnected by chain 143, and bearings 144 and 145 pivotally connecting beam 130 with chains 138 and 143, respectively. Inspection of FIGS. 7 and 11 shows (a) that collector bars 82 and 83 each have nine equally-spaced notches with each notch of bar 82 in transverse alignment with a corresponding notch of bar 83 and forming a pair therewith, (b) that the central three of these pairs of notches are directly over tank 14, (c) that when unit 92 is in its forwardmost position relatively to collector bars 82 and 83, all three notches in its beams 130 and 131 are vertically aligned with the final three notches of bars 82 and 83, respectively, and (d) that when unit 92 is in its rearwardmost position relatively to collector bars 82 and 83, the final notches of its beams are vertically aligned with the line of travel 129 of the return conveyor.

The Electrical Circuit and Operaiton

The electrical control and synchronizing hook-up is best described in connection with an explanation of the operation of the machine. First, however, reference is made to FIGS. 6 and 6a, showing in detail the construction of pushbutton switch 175 which is operated in response to translation of the dip tank into lowermost position during each cycle.

In these figures, 217 identifies a vertically translatable angle bar which extends horizontally across the end of frame 1. Bar 217 has been omitted from FIG. 4 to avoid obscuration of important parts lying behind it. The ends of bar 217 are connected to the vertical passes of cables 44 and 45, the latter only appearing upon FIG. 6a. As there indicated, attachment is by means of conventional clamps such as 212. Thus, in a manner obvious from previous description, bar 217 is translated upwardly as the tank descends, and vice versa.

Switch 175 is a special pushbutton type including a casing 213 and vertically-disposed buttons 214 and 215 which are interconnected by a switch lever generally indicated at 216, FIG. 6, so that one moves in as the other moves out. Lever 216 is pivoted at 216a, between its ends, and has an arm 216b extending at 90° therefrom. The tip of this arm is insulated and travels over and in sliding contact wtih, a pair of commutator bars 216c and 216d arcuate about pivot 216a as a center. These commutator bars each have a live segment as clearly indicated upon FIG. 6, so that the tip of arm 216b bridges them and momentarily closes the circuit of leads 243 and 243a as it passes from one side of the vertical to the other. The switch is fixed to a bar 211 forming a part of frame 1 and is so disposed that the buttons are in the vertical plane of travel of angle bar 217. The latter bar is omitted in FIG. 4, for clarity of illustration.

The central lower portion of switch casing 213 is cut away as indicated at 218, FIG. 6, and has plates 219 and 220. In FIG. 6, plate 219 has been omitted to avoid obscuration of the toggle mechanism. See FIG. 6a. These plates 219 and 220 are identical and identically disposed, and each has therein, respectively, a slot 221 and 222 in the form of an inverted V. Theses lots are aligned transversely of plates 219 and 220.

A pin 223 is disposed so that its ends ride freely in the respective slots of the plates. A toggle link 224 has its upper end fixed to the central portion of the pin between plates 219 and 220. The lower end of this link is pivotally connected with a toggle plate 225, by means of a pin 226, the construction and arrangement being such that the plate is pendulously stable about the axis of pin 226, in the horizontal position shown. Stops 227 and 228, FIG. 6, are fixed to the upper surface of bar 217 to define the limiting positions of the plate longitudinally of the bar. Holes 229 and 230 are formed in the upper face of bar 217, so sized and positioned as to permit buttons 214 and 215, respectively, to pass freely therethrough when unobstructed by plate 225.

FIG. 6 and 6a show the position of the parts as the tank 14 moves into lowermost position so that bar 217 is in its upper limiting position. Plate 225 is in leftward limiting position as the parts are viewed upon FIG. 6. In this position it lies over and obstructs hole 229, so that, as the bar 217 moves upwardly to the limiting position shown, button 214 has been engaged by the plate and pushed upwardly into its casing. Since hole 230 is unobstructed at this time, button 215 may simultaneously move downwardly.

Prior to engagement between button 214 and the upwardly-moving plate 225, the latter hangs pendulously horizontal, with the pin 223 engaging the lower left ends of slots 221 and 222, FIG. 6a. But as upwardly-moving bar 217 contacts plate 225, pin 223 rides upwardly in and along the slots and simultaneously pivots link 224 clockwise until, in the final position shown, button 214 is fully moved inwardly, button 215 is in outwardmost position, and pin 223 has moved slightly beyond the crest or apex of the slots. As the tank starts to rise, under the control subsequently described, so that bar 217 starts simultaneously to descend, plate 225 is released and, as pin 223 rides down the right portion of the slots, link 224 pivots counterclockwise and plate 225 moves to the right from the position shown. When the ends of pin 223 engage the lower right ends of slots 221 and 222, the plate, still horizontal, is suspended beneath button 215 in a position symmetrically to the right of FIG. 6, in position over hole 230 to obstruct the same and push button 215 upwardly in response to movement of the tank to lowermost position of the next succeeding cycle.

Switch 175 is thus constructed as clearly shown upon FIG. 6, so that when either button is pushed from full-out to full-in position, the normally-open switch is momentarily closed and then immediately reopened, in the manner previously described.

FIG. 6b shows a switch which may be used alternatively to that of FIGS. 6 and 6a. Referring to FIG. 6b, a part of tank 14 has a bracket 231 fixed thereto. A lever 232 is pivoted at 233 to this bracket and is urged into clockwise rotation by a leaf spring 234, into contact with a stop 235 fixed with bracket 231. A switch lever 236 is pivoted at 237 to any convenient part of frame 1, in position such that, as tank 14 moves into its lowermost position, a nose on lever 232 engages a corresponding nose on lever 236 and pivots the same from the position shown, counterclockwise, to bridge contacts 238 and 239. Just as the tank reaches lowermost position, the nose of lever 232 passes off that of lever 236 and the latter is immediately restored to circuit-opening position by a spring 240. Such movement is limited by a stop 241. When the tank moves up, spring 234 yields and the nose of lever 232 simply rides over that of lever 236.

Assuming all parts in readiness for operation and conveyor chain 89 advancing in the direction of the arrow associated with line 109, FIG. 7, a first rod 90, loaded with parts to be dipped such as objects A, FIG. 9, passes along one side of the machine. As its leading end reaches the position shown upon FIG. 9, it contacts and closes normally-open switch 146, FIGS. 7, 9 and 12, thus closing a circuit from one side of the line 147, lead 148, switch 146, lead 148a, relay coil 149, lead 150 and normally closed switch 169, to the other side of the line 151. Energization of coil 149 closes relay contacts 152, to close the circuit through motor 153 over lead 154 contacts 152, and lead 155. Motor shaft 156 is coupled by means, not shown, to rotate synchronously, all four sets of sprockets of translating unit 91 in the manner previously described. Energization of relay coil 149 also closes contacts 156 to short out switch 146, thereby locking in relay coil 149.

Actuation of transfer unit 91 first moves beams 93 and 94 thereof, forwardly at lower level until the leading notches thereof are below the first rod 90. The beams then move upwardly to engage and lift the rod from the hooked ends of conveyor assemblies 86. Continued movement of the transfer unit carries the rod rearwardly until it is over the final pair of notches in collector bars 82 and 83, then lowers it until it is supported solely by these bars. Energization of solenoid coil 149 also opens contacts 157, thus de-energizing conveyor drive motor 158 in a manner obvious from inspection of FIG. 12.

As the beams of transfer unit 91 start forwardly again at lower level, a projection 159 on their driving chain 106 contacts and momentarily opens a normally-closed switch 160 thus de-energizing relay coil 149, so that switches 152 and 156 open and stop motor 153. Momentum of the armature of motor 153 and the parts driven thereby are sufficient to carry projection 159 a little past switch 160 so that the latter closes. However, switch 146 is at this time open, so that motor 153 remains at rest.

As relay coils 149 is de-energized, switch 157 closes and again starts conveyor drive motor 158 to advance the second rod 90 into the unloading position of FIG. 9 and again close switch 146. The cycle just described is repeated, except that, as beams 93 and 94 rise, they also pick up the first rod as well and in forward and downward movement, deposit the first rod in the second pair of notches of bars 82 and 83. The third cycle, initiated as the third rod 90 moves into collecting position, lifts all three rods and on close of this cycle the first, second and third rods rest in the third, second and first notches, respectively, of bars 82 and 83.

As the aforesaid third cycle nears its close and the first rod 90 is lowered by transfer unit 91 into support by the third pair of notches of bars 82 and 83, it contacts and closes a normally open switch 161, FIG. 12, secured to one of these bars just below the third notch therein. Closure of switch 161 energizes the coil of relay 162, FIG. 12, over a circuit traced from one side of the line 147, lead 163, switch 161, the coil of relay 162, lead 164 and normally closed switch 172, to the other side of the line 151. Relay 162 then closes to establish a holding circuit at contacts 165, thus shorting out switch 161, and also closes contacts 166 to energize motor 167, over a circuit traced from line 147, lead 168, contacts 166, lead 169, motor 167, and lead 170 to the other side of the line 151.

Motor 167 is connected to drive accumulator unit 110. For example, motor shaft 171 may be connected through a reduction belt drive, not shown, to rotate sprockets 119 and 125, as well as the corresponding sprockets, not shown, adjacent beam 112. The beams thus advance at lower level until their forward notches are in a common vertical plane plane with the forward notches of bars 82 and 83, then they rise to left the first, second, and third flight rods, then move forwardly at upper level until these rods are over the fourth, fifth and sixth notches 84 of the collector bars, and finally descend to deposit the rods in the respective notches of the bars. As bearing 121 nears the forward end of its lower pass, a projection thereon, not shown, engages and opens a normally-closed switch 172, thus breaking the holding circuit through relay 162 and opening the contacts at 165 and 166 to stop motor 167. Due to the momentum of the mechanical drive the bearing 121 coasts a little past switch 172 which immediately closes again. Since switch 161 is open at this time, relay 162 remains deenergized.

Figure 12:
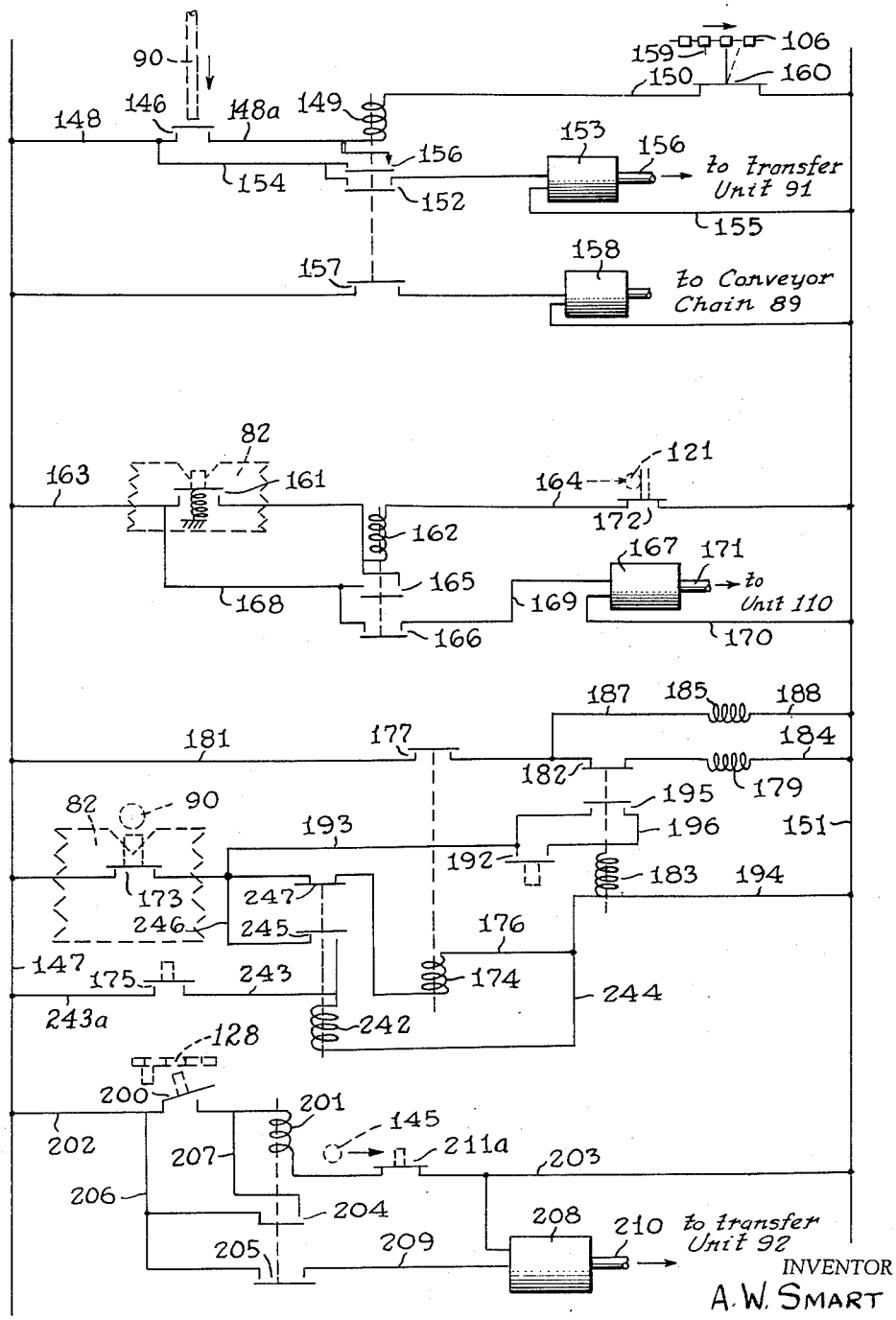
FIG. 12 is a complete wiring diagram of the machine.

As the accumulator unit lowers the first, second and third flight rods, as a unit into the fourth, fifth and sixth notches 84, respectively, of the collector bars, one of these rods, for example, the second, as shown, contacts and closes a normally-open switch 173, FIGS. 10 and 12. Closure of switch 173 effects energization of the solenoid of a relay 174, over a circuit traced from one side of the line 147, switch 173, presently closed contacts 247 the coil of relay 174 and leads 176 and 194, to the other side of the line at 151.

Energization of relay 174 closes contacts at 177. Closing of contacts 177 energizes the solenoid 179 of a balanced valve 180, FIGURES 3 and 13, over a circuit extending from one side of the line 147, lead 181, contacts 177, the normally-closed contacts 182 of a relay 183, solenoid 179 and lead 184 to the other side of the line 151. Closure of contacts 177 also energize the solenoid 185 of a simple on-off valve 186, FIG. 3, over a circuit including lead 181, contacts 177, lead 187, solenoid 185 and lead 188 to the other side of the line 151.

Energization of solenoid 179 moves the piston 189 of valve 180 to the position shown at FIG. 13; and since valve 186 is also now open, pressure fluid is forced by pump 190 through pipe 199, the valves and pipe 191 to hydraulic cylinder 26 to elevate dip tank 14 in the manner previously described. During this operation fluid is exhausted from the forward end of cylinder 26 over pipe 197, through valve 180 and pipe 198 to the intake of pump 190. As the tank moves into its upper limiting position, a part fixed therewith engages and closes a switch 192. Closure of contacts of switch 192 energizes the solenoid of relay 183, over a circuit traced from first side of the line 147, switch 173, lead 193, switch 192, the coil of relay 183, and lead 194 to the other side of the line 151. Energization of the coil of relay 183 closes its contacts 195 to establish a holding circuit through lead 193, contacts 195, lead 196, the coil of relay 183, and lead 194. At the same time, contacts 182 of relay 183 are opened, thus deenergizing the solenoid 179 of valve 180. It is to be noted that solenoid 185 remains energized so that valve 186 remains open.

Upon de-energization of solenoid 179, spring 182a of valve 180, moves piston 189 thereof to its limiting position to the right as the parts are viewed upon FIG. 13. Thereby the delivery pipe 199 of pump 190 is connected through presently-open valve 186 and valve 180, to pipe 197, while pump intake pipe 198 is connected with pipe 191 so that lowering of tank 14 is effected smoothly at a rate which may be precisely controlled by delivery rate of the pump. As the tank approaches its lowermost position, switch 175 momentarily closes and then reopens at the instant the tank moves into its limiting down position, as previously described. Alternatively, the same function is effected if the switch shown at FIG. 6b is employed.

On closure of switch 175, the relay solenoid 242 is energized over leads 243a 243, 244 and 194, and operates to close its contacts 245 to establish a holding circuit which extends from side of the line 147, through presently-closed switch 173, lead 246, contacts 245, solenoid 242 and leads 244 and 194 to the other side of the line 151. Energization of solenoid 242, also opens contacts 247, thus de-energizing the solenoid of relay 174 whose contacts open so that on-off valve 186 closes. Since relay solenoid 242 is locked in, the immediate opening of switch 175 has no effect on this relay. The operation will be so timed that the series of flight rods positioned over the tank, and supporting articles which have just been dipped, will be lifted by accumulator unit 110 a little after the tank reaches its lower level. The exact time interval will not be critical but, for maximum efficiency will be kept small. As the flight bar of this series over switch 173 is lifted, the switch opens thus de-energizing relay solenoid 242, closing contacts 247 to condition relay solenoid 174 for the next batch of articles to be dipped. Thus, on the next closure of switch 173, the tank cycle will be repeated.

As will be subsequently described in detail, the operations of transfer units 91, 92 and accumulator unit 110 are synchronized and continuous. Hence, on the succeeding operation of unit 110 to pick up the next set of three flight rods 90 to transfer them into position over tank 14, for dipping of the articles suspended therefrom, the rods supporting the articles just dipped are also picked up and transferred to the final three notches of the collector bars 82 and 83. It was previously mentioned that conveyor 128 which carries the flight rods from the machine after the articles supported thereon have been dipped, may be the return pass of conveyor chain 89, or the pass of a separate conveyor chain. In either event, the linear rate of travel thereof is synchronized with that of chain 89. Whichever arrangement is selected, the return conveyor line 128 will carry accurately-spaced signal producing means, not shown. Such means may be projections fixed to the chain at equal intervals therealong, each adapted to engage and momentarily close a switch 200, FIGS. 7 and 12, carried by the frame of the machine. Alternatively, of course, the signal producing means may be magnetic or inductive plates which create a signal in a pick-off or inductively-operated circuit closer carried by the machine. Such devices are well known in the prior art and need not be described in detail. The essential thing is that the switch or circuit closer 200 be actuated successively, in properly-timed relation with switch 146 controlling transfer unit 91 and also that the sequence of operations be timed so that a pair of hook assemblies such as 86 on conveyor chain 128 will be in proper position to receive a rod 90 when deposited by transfer unit 92.

When switch 200 is closed, a circuit is established from line 147, lead 202, switch 200, the solenoid of relay 201, normally-closed switch 211a and lead 203, to line 151, thus closing relay contacts 204, 205. Closure of contacts 204 establishes a holding circuit over leads 202, 206 and 207. Closure of contacts 205 establishes a circuit energizing motor 208 over a circuit traced from one side of the line 147, leads 202 and 206, contacts 205, lead 209, motor 208 and lead 203, to the other side of the line 151. The shaft 210 of motor 208 is connected by a mechanical drive, not shown, to synchronously rotate all sprockets 135, 136, etc. of transfer unit 92. Such mechanical drive will preferably be a duplicate of that connecting motor 153 with the sprockets of unit 91.

Bearing 145 has been previously described as attached to chain 143 to the rearward end of beam 130. This bearing has a projection which engages and momentarily opens switch 211a, FIGS. 11 and 12. The arrangement is such that switch 211a breaks the holding circuit for relay 201 as unit 92 completes delivery of a flight rod 90 to conveyor pass 128 and beams 130, 131 begin their forward movement at lower level. This action de-energizes motor 208 and as the momentum of the parts causes the projection on bearing 145 to coast a little past switch 211a, the latter closes and conditions the circuit for the next cycle.

Actually, since the operation is a continuous procedure, it is also contemplated that by proper synchronization of the parts, a single motor, as 153, may be connected to drive both transfer units 91 and 92, under control of switch 146 only.

*Résumé*

Although the description has necessarily been described step-by-step, it will be understood that, actually, the operation is a continuous, production line procedure. Switch 172 is so located upon the frame of the machine, that, when momentarily opened by the aforesaid projection on bearing 121, the beams 111, 112 of accumulator unit 110, have nearly completed their forward motion at lower level. Consequently, they do not have far to move before picking up the set of three flight rods deposited by transfer unit 91; thus these have been removed from the first three notches of the collector bars 82 and 83, before the unit 91 has had time to return and deposit the first rod of the next succeeding set of three.

All switches will be mounted for adjustment so that a very fine, precise, and accurate timing of operations may be established.

The essential things, of course, are, first to time the operation of transfer unit 91 so that a complete set of flight rods will have been accumulated on bars 82 and 83, ready to be transferred as a unit to dipping position over tank 14 by the time the tank moves into full lower position, and, secondly to time the operation of transfer unit 92 so that the final three notches of collector bars 82 and 83 will have been vacated at the same time, ready to receive a new series of flight rods from dipping position. Units 91 and 92 may thus be operated in precise synchronism while, in the model shown, beams 111 and 112 will be automatically operated every third operation of units 91 and 92.

FIGURE 15 is a perspective view of the assembled machine. In this view, tank 14 is shown near its upper limit of travel, just after it has begun to descend. Transfer unit 91 has just raised the third of a set of three flight rods 90, from conveyor 85 and is about ready to move rearwardly to deposit these three rods to the first three notches of collector bars 82 and 83. Transfer unit 92 is about to deliver to conveyor 128, the final one of a set of three flight rods bearing articles previously dipped. Tank 14 will descend smoothly but rapidly and at about the same time that it closes switch 175, transfer unit 91 will have deposited the three rods bearing articles to be dipped, onto collector bars 82 and 83, thus closing switch 161 and energizing motor 167, driving accumulator unit 110, and transferring the set of three rods bearing articles just dipped to the final three notches of collector bars 82 and 83, in positions to be picked up by transfer unit 92, and at the same time, moving the set of three rods bearing articles to be dipped, onto the collector bars in positions over tank 14.

The critical time in operation of my invention is that required for the elevation and lowering of the tank. All other time periods, such as that required for a complete cycle of transfer unit 91, are coordinated with this time. Although capable of use for any production-line dipping procedures, the invention is of especially great utility in the application of lacquers, varnishes or resinous coating liquids, either clear or pigmented, such as enamels or undercoating, and, in general, for the application by dipping, of liquids for ornamental and/or surface protection. The machine forming the subject of this invention, when properly operated, will coat articles without imperfections such as runs, sags, drips, tears, flow marks, fat edges or other imperfections previously common with dip coating procedures.

I have discovered that when articles are withdrawn at relative slow, smooth uniform speed from immersion in a dip coating, that the coating itself acts as a squeege by the surface tension and capillary attraction of the liquid. This phenomenon limits the thickness of the film remaining upon the article in accordance with the speed of withdrawal and the viscosity of the coating liquid. Thus it is important for thorough uniform coating, without imperfections, that the speed of withdrawal be precisely controlled, uniform and smooth. By my invention the last drop or tear is removed from the articles, leaving a smooth, attractive coating without the imperfections previously noted, which are common with prior art dipping procedures.

In the prior art immersion or dip coating of articles, in order to permit free and adequate drainage, has been performed with solvents and/or diluents having an evaporation rate below 200, with butyl acetate taken as having an evaporation rate of 100, to permit the free drainage of the coating material from the articles. My process involves the use of solvents and/or diluents with an evaporation rate above 300 to obtain a rapid flash-off or evaporation of the liquids as the surfaces of the article emerge from the bath, to thereby obtain a set of the coating by evaporation of the solvents and/or diluents from the film, so that no further flowing is possible, leaving a coating over the entire article regardless of dimension in any direction of up to 1 mil or more dry film thickness for pigmented materials and up to one-half mil or more dry film thickness for unpigmented materials over the entire article. This uniformity of dry film thickness and the protection it offers has no previously been attained by dipping.

Ventilation across the liquid surface should be provided at about 25 to 50 feet per minute to flash off the solvents and/or diluents from the finished coatings as the parts emerge from the bath, to prevent vapor wash.

While for the purpose of compliance with the patent statutes, I have disclosed my invention as embodied in a definite precisely described machine, numerous variations, modifications and substitutions of equivalents will occur to those skilled in the art after a study of the foregoing disclosure. Consequently, this disclosure should be taken in an illustrative rather than a limiting sense; and it is my desire and intention to reserve all such modifications and substitutions within the spirit and scope of the subjoined claims.

Having now fully disclosed the invention, what I claim and desire to secure by Letters Patent is:

1. In a dipping machine, horizontally disposed collector bar means, a transfer unit mounted for movement in a fixed path lying in a vertical plane parallel with and adjacent said collector bar means, means cyclically moving said transfer unit to pick up flight rods, one by one, and deposit them in sequence on said collector bar means, while simultaneously picking up and advancing by one step on and along said collector bar means, flight rods previously deposited thereon, and means responsive to accumulation of a predetermined number of flight rods on said collector bar means to transfer all said accumulated rods as a unit along said collector bar means into dipping position.

2. A dipping machine as in claim 1, said last-named means comprising a motor and a control circuit including a switch actuated by deposit of the leading one of said predetermined number of rods onto said collector bar means.

3. A dipping machine as in claim 1, a dip tank, power means operable to move said tank vertically relatively to and adjacent said collector bar means, and means responsive to deposit of said flight rods into said dipping position, to effect energization of said power means.

4. A dipping assembly comprising a tank, collector bar means fixed adjacent said tank, means operable to transfer and deposit discrete article support means one by one to said collector bar means, while simultaneously advancing by one step on and along said collector bar means, support means previously deposited thereon, means responsive to accumulation of a predetermined number of support means on said collector bar means, to transfer the same as a unit into dipping position over said tank, and means responsive to transfer of said predetermined number of support means to said dipping position to effect relative vertical movement between said tank and collector bar means.

5. In a dipping machine assembly, a tank, collector bar means fixed with said tank and constructed and arranged to support a predetermined plurality of flight rods in horizontally-spaced relation over said tank, a first transfer unit mounted for cyclic movement in a vertical plane parallel with and adjacent the receiving end of said collector bar means, to pick up flight rods one by one and deposit the same on said collector bar means, while simultaneously advancing by one step on and along said collector bar means, flight rods previously deposited thereon, an accumulator unit responsive to deposit of a set comprising a predetermined number of flight rods on said collector bar means, to transfer said set of rods as a unit on and along said collector bar means to dipping position over said tank and, simultaneously to transfer the rods of a preceding set of flight bars from dipping position to unloading position on and along said collector bar means, means responsive to deposit of a set of rods in dipping position to elevate said tank to immerse objects carried by said set of rods, a second transfer unit, and means responsive to deposit of a set of rods in unloading position to unload said rods from said collector bar means.

6. In a dipping assembly, fixed, horizontally-disposed collector bar means, a transfer unit mounted for movement in a rectangular path lying in a vertical plane parallel with and adjacent said collector bar means, a conveyor having a pass normal to said plane adjacent said collector bar means, means translating said transfer unit cyclically in said path to pick up flight rods in sequence from said conveyor and deposit the same on said collector bar means while simultaneously advancing by one step, each flight rod previously deposited thereon, a dip tank in adjacent fixed relation with said collector bar means, means responsive to accumulation of a predetermined number of flight rods on said collector bar means, to transfer all said accumulated rods as a unit into dipping position over said tank, and means responsive to deposit of said rods as a unit into dipping position to elevate said tank to immerse articles supported by said rods.

7. An assembly as in claim 6, said collector bar means comprising a pair of fixedly mounted, horizontal, horizontally-spaced bars in side-by-side relation, each having a plurality of equally-spaced notches in its upper edge, each notch of one bar being opposite to and forming a pair with a corresponding notch of the other bar.

8. An assembly as in claim 6, said last-named means including a hydraulic cylinder, a source of pressure fluid, conduit connections between said cylinder and source, including a solenoid valve, and circuit means including the solenoid of said valve and a switch actuated by and in response to deposit of one of said rods in dipping position on said collector bar means.

9. In a dipping machine, a tank, means to successively collect articles to be dipped and to support the same in successive, horizontally-spaced positions above and adjacent said tank, means responsive to initial collection of a set of articles to advance the same as a unit into dipping position over said tank, while simultaneously advancing a previously-dipped set of articles into unloading position, means responsive to deposit of a set of articles into dipping position to effect relative vertical movement between the same and said tank to dip said articles, and means responsive to deposit of a set of articles in unloading position to remove the same for conveyance from said machine, all said means being operated in continuous timed production-line sequence.

10. A dipping apparatus comprising a dip tank, conveyor means constructed and arranged to deliver flight bars in single file aligned relation adjacent and at one side of said tank, collector support means adjacent said tank, transfer means operable to transfer flight bars one-by-one to said collector means from said conveyor means, means responsive to collection of a pre-selected plurality of said bars on said collector support means to transfer all said collected bars as a unit directly over said tank, and means responsive to positioning of said collected bars over said tank to effect relative vertical movement between said tank and collected bars to immerse articles suspended therefrom.

11. An apparatus as in claim 10, said last-named means comprising pulley and flexible cable means, a hydraulic cylinder and piston assembly operable on said cable means to elevate said tank, a source of pressure fluid, conduit means connecting said source and cylinder and including a solenoid valve, said circuit means operating to energize the solenoid of said valve to admit pressure fluid to said cylinder and thereby elevate said tank.

12. An apparatus as in claim 11, said cylinder being double acting, said valve on de-energization reversing the conduit connections between said source and said cylinder to effect lowering of said tank at a positively controlled rate.

13. A dipping apparatus comprising a dip tank, a conveyor operable to deliver flight rods in a first horizontal direction, in single file adjacent said tank, collector bars mounted at respective sides of said tank in a second horizontal direction angularly related with said first direction, transfer means, power means moving said transfer means in response to arrival of each successive flight rod in position adjacent said tank to transfer the same to said collector bars, in horizontally spaced parallel relation, accumulator means responsive to assembly of a pre-selected number of rods on said collector bars to advance said collected rods as a unit along said collector bars to a position directly over said tank, and means responsive to positioning of said collected rods over said tank to elevate the same to immerse articles suspended from said collected rods.

14. In a dipping apparatus, a dip tank, collector bar means constructed and arranged to support in horizontally-spaced positions a plurality of articles to be dipped, conveyor means operable to deliver articles successively to a transfer station adjacent said tank, a transfer unit operable in successive cycles to remove articles from said conveyor on arrival at said station and deposit the same onto said collector bar means, said unit operating simultaneously to advance by one position, each article previously removed from said conveyor means, means responsive to arrival of each succeeding article at said station to operate said transfer unit through one cycle, and means responsive to accumulation of a predetermined number of articles on said collector bar means, to convey said articles as a unit to position over said tank for dipping therein.

15. In a dip tank assembly, fixed for horizontally disposed collector bar means, a transfer unit, mounted for movement in a rectangular path lying in a vertical plane parallel with and adjacent one end of said collector bar means, a conveyor having a pass normal to said plane adjacent said collector bar means, to convey flight rods in aligned single file adjacent said collector bars, means responsive to arrival of each flight rod position to translating said transfer unit cyclically in said path to pick up each flight bar in sequence from said conveyor and deposit the same on said collector bar means, while simultaneously advancing by one step, each flight bar previously deposited thereon, a dip tank mounted adjacent said collector bar means, and means responsive to accumulation of a predetermined number of flight bars on said collector bar means, to transfer all said accumulated bars as a unit on and along said collector bar means into dipping position over said tank.

16. In a dipping apparatus, a dip tank mounted for vertical translation, conveyor means operable to deliver successively flight rods in single file horizontally adjacent said tank, collector means adapted to support a plurality of said rods adjacent said tank, transfer means operable to transfer said rods successively from said conveyor to said collector means, means responsive to collection of a pre-selected number of rods on said collector means to transfer all said collected rods as a unit to a position directly over said tank, and means responsive to positioning of said collected rods over said tank to elevate the same to immerse articles suspended from said rods.

References Cited in the file of this patent

UNITED STATES PATENTS

| | | |
|---|---|---|
| 527,628 | Thomas | Oct. 6, 1894 |
| 1,197,925 | Elliott | Sept. 12, 1916 |
| 2,114,974 | Camerota | Apr. 19, 1938 |
| 2,141,470 | Harry | Dec. 27, 1938 |
| 2,068,367 | Bohannon | Jan. 19, 1937 |
| 2,811,132 | Ahlbin | Oct. 29, 1957 |

UNITED STATES PATENT OFFICE
CERTIFICATE OF CORRECTION

Patent No. 3,121,646                          February 18, 1964

Alfred W. Smart, deceased, by
Helen A. Smart, executrix

It is hereby certified that error appears in the above numbered patent requiring correction and that the said Letters Patent should read as corrected below.

Column 4, line 2, for "bearing" read -- bearings --; column 5, line 31, after "left" insert -- end --; line 39, for "from" read -- form --; line 41, for "cloplanar" read -- coplanar --; column 8, line 31, for "Operaiton" read -- Operation --; line 57, for "wtih" read -- with --; column 10, line 29, for "coils" read -- coil --; line 54, for "179" read -- 170 --; line 63, for "left" read -- lift --; column 12, line 46, for "to", second occurrence, read -- at --; column 14, line 8, for "no" read -- not --.

Signed and sealed this 13th day of October 1964.

(SEAL)
Attest:

ERNEST W. SWIDER                          EDWARD J. BRENNER
Attesting Officer                            Commissioner of Patents